United States Patent
Tetzlaff et al.

(10) Patent No.: US 6,315,624 B1
(45) Date of Patent: Nov. 13, 2001

(54) EXHAUST PROBE

(75) Inventors: Patrick C. Tetzlaff, Franklin, WI (US); Gregory J. Binversie, Grayslake, IL (US); Brian T. Leadingham, Kenosha, WI (US); James E. Macier, Beach Park, IL (US); Roger W. Raetzman, Kenosha, WI (US)

(73) Assignee: Bombardier Motor Corporation of America, Melbourne, FL (US)

( * ) Notice: Subject to any disclaimer, the term of this patent is extended or adjusted under 35 U.S.C. 154(b) by 0 days.

(21) Appl. No.: 09/558,681

(22) Filed: Apr. 26, 2000

(51) Int. Cl.$^7$ .................................................. B63H 21/32
(52) U.S. Cl. .................................................. 440/89; 440/1
(58) Field of Search ............................................. 440/89, 1

(56) References Cited

U.S. PATENT DOCUMENTS

| | | | |
|---|---|---|---|
| 4,466,880 | * | 8/1984 | Torii et al. ............................ 204/428 |
| 5,637,792 | * | 6/1997 | Kimura et al. ........................ 73/116 |
| 5,711,148 | * | 1/1998 | Katoh ..................................... 60/276 |
| 5,911,610 | * | 6/1999 | Fujimoto ................................ 440/89 |

* cited by examiner

Primary Examiner—Sherman Basinger
(74) Attorney, Agent, or Firm—Armstrong Teasdale LLP

(57) ABSTRACT

The present invention, in one aspect, includes a probe for sensing exhaust gas pressure in an exhaust path of a marine engine during engine operation. In an exemplary embodiment, the probe includes an elongate probe body and an engine engagement assembly secured to the probe body and configured to engage to the engine so that said probe body at least partially extends into the engine exhaust path. The probe body comprises a hollow, cylindrical shaped member, and at least one opening extends through a side wall of the cylindrical shaped member. A cap is secured to and closes an open end of the probe cylindrical shaped member, and a pellet is located, i.e., trapped, within the cylindrical shaped member. The engine engagement assembly includes a threaded portion sized to be threadedly engaged within an opening in flow communication with the engine exhaust path, and a tube connection portion sized to be inserted within a tube.

46 Claims, 4 Drawing Sheets

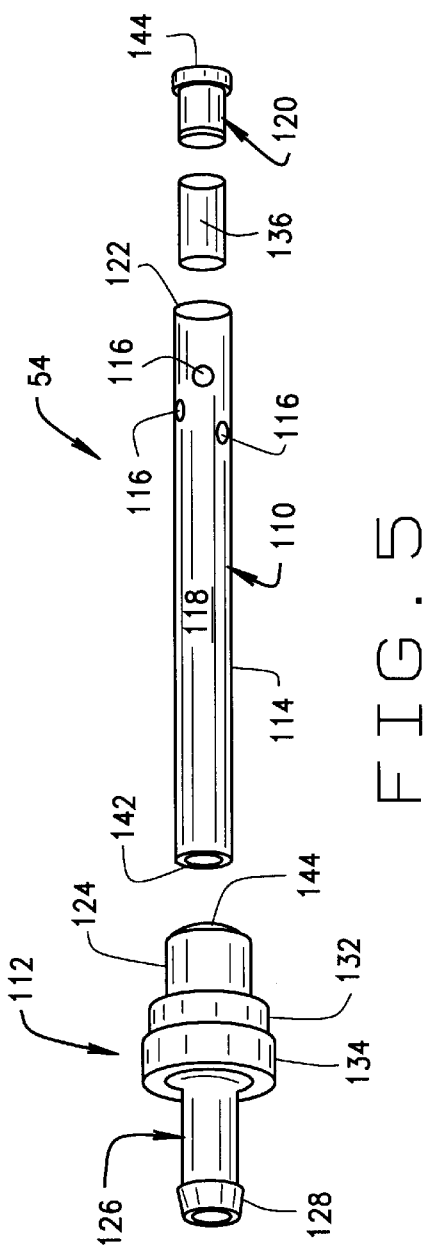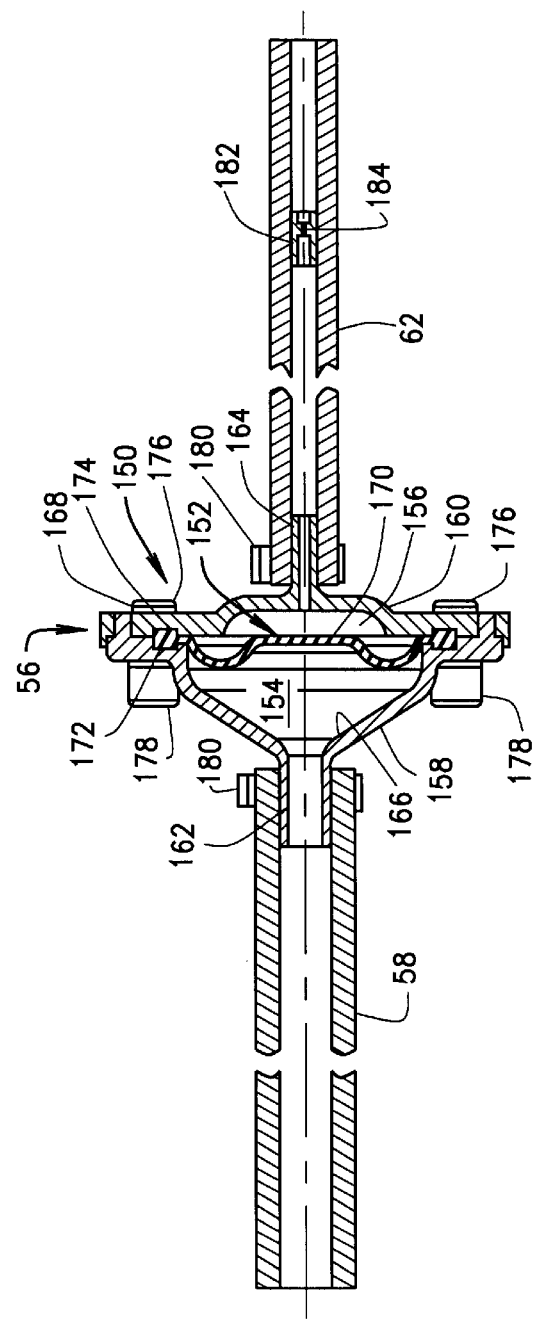

EXHAUST PROBE

BACKGROUND OF THE INVENTION

This invention relates generally to marine engines and, more specifically, to detecting engine exhaust gas pressure in a fuel injected or direct fuel injected engine.

Marine engines typically include a power head, an exhaust housing, and a lower unit. A drive shaft extends from the power head, through the exhaust housing, and into the lower unit. The lower unit includes a gear case, which supports a propeller shaft. One end of the propeller shaft is engaged to the drive shaft, and a propeller is engaged to an opposing end of the shaft.

In order to maintain optimum combustion, as airflow to the cylinders increases, fuel flow to the cylinders also should increase. As airflow to the cylinders decreases, fuel flow to the cylinders also should decrease.

Many variables impact airflow to the cylinders including conditions at the propeller. For example, the depth at which an engine propeller is located in the water impacts air flow through the engine, including an amount of fresh air supplied to the engine cylinders. Fuel flow to the cylinders also is adjusted based on operating parameters such as atmospheric pressure and intake air temperature. An absolute pressure sensor typically is utilized for generating a signal representative of atmospheric pressure, and a temperature sensor typically is located at the engine air intake to generate a signal representative of intake air temperature. The sensors are coupled to, or part of, an electronic control unit (ECU), which samples the signals generated by the sensors and adjusts fuel flow according to the sampled signals.

An additional parameter that has a significant impact on fresh airflow to the engine cylinders is exhaust flow. Specifically, a key parameter governing the exhaust gas flow is the gas pressure within the exhaust system. Known commercial marine engines, however, do not utilize exhaust gas pressure data in controlling the fuel/air ratio in the engine cylinders.

More specifically, and until now, the difficulties and costs associated with measuring such exhaust gas pressure for controlling the fuel/air ratio during engine operations were prohibitive in commercial marine engines. For example, the carbon and soot resulting from the combustion process can collect and block the sensor, preventing it from reading pressure. In addition, exhaust gas from an internal combustion engine contains known corrosive compounds which can damage electrical components.

BRIEF SUMMARY OF THE INVENTION

The present invention, in one aspect, includes a probe for sensing exhaust gas pressure in an exhaust path of a marine engine during engine operation. More specifically, a marine engine typically has a power head including an internal combustion engine having an exhaust system with an exhaust outlet. The power head also includes an adapter. A main exhaust gas duct extends through the adapter, the exhaust housing, and into the lower unit. A key parameter in determining the amount of airflow through the engine is the gas pressure within the exhaust housing.

In an exemplary embodiment, the probe includes an elongate probe body and an engine engagement assembly secured to the probe body and configured to engage to the engine so that said probe body at least partially extends into the engine exhaust path. The probe body comprises a hollow, cylindrical shaped member, and at least one opening extends through a side wall of the cylindrical shaped member. In one specific embodiment, three openings extend through the cylindrical shaped member side wall, and the openings are radially spaced about 120° apart from each adjacent opening.

A cap is secured to and closes an open end of the probe cylindrical shaped member, and a pellet is located, i.e., trapped, within the cylindrical shaped member. Specifically, the cylindrical shaped member has an inner diameter surface and a ledge formed in the inner diameter surface. The pellet is trapped between the ledge and the cap. In one specific embodiment, the pellet is sintered metal.

The engine engagement assembly includes a threaded portion sized to be threadedly engaged within an opening in flow communication with the engine exhaust path, and a tube connection portion sized to be inserted within a tube. The tube is in flow communication with, for example, an engine ECU.

The probe typically is installed through an opening in a power head adapter and into flow communication with an exhaust duct that extends from the power head, through the exhaust housing, and through the engine lower unit. The probe is threadedly engaged to the power head, and a tube is coupled to and extends from the probe and is in flow communication with the engine ECU. A diaphragm may, for example, be in the flow path between the probe and the engine ECU to protect the ECU from chemicals and soot flowing through the engine exhaust duct.

During engine operation, exhaust output from each cylinder flows through the exhaust duct and past the probe. The flow of exhaust gas is partially determined by the pressure in the exhaust system. The exhaust gas pressure is communicated from the probe to the engine ECU. Using such pressure data as well as other operating data supplied to the engine ECU, the ECU controls the fuel/air ratio in the engine cylinders.

The sintered metal pellet located within the probe body dampens the exhaust pressure spikes as well as facilitates preventing soot and carbon from building up within the probe and possibly damaging or blocking the flow path through the probe. Specifically, the pellet holds the soot and carbon that enters into the probe at or around the tip of the probe. The tip of the probe is located in the hot exhaust flow, and as a result, the soot and carbon the collects within the probe burns and does not damage the probe nor block flow through the probe.

BRIEF DESCRIPTION OF THE DRAWINGS

FIG. 5 is an exploded view of the probe shown in FIG. 4.

FIG. 8 is a cross-sectional view of the diaphragm shown in FIG. 7 along Line 7—7.

DETAILED DESCRIPTION OF THE INVENTION

The present invention is described herein in the context of an outboard engine. The present invention could, however, be utilized in connection with a stern drive engine as well as with an outboard engine. Further, the present invention is not limited to practice with any one particular engine, and therefore, the following description of an exemplary engine relates to only one exemplary implementation of the present invention.

Figure 1:
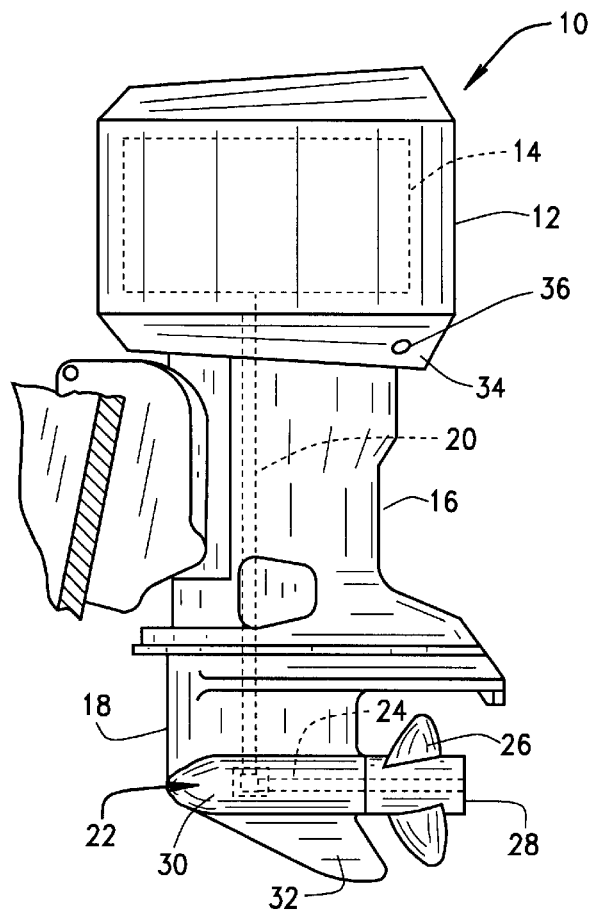
FIG. 1 is a side view of an outboard engine.

Referring more particularly to the drawings, FIG. 1 is a perspective view of an outboard engine 10, such as an outboard engine commercially available from Outboard Marine Corporation, Waukegan, Ill. Engine 10 includes a cover 12 which houses a power head 14, an exhaust housing 16, and a lower unit 18. A drive shaft 20 extends from power head 14, through exhaust housing 16, and into lower unit 18.

Lower unit 18 includes a gear case 22 which supports a propeller shaft 24. One end of propeller shaft 24 is engaged to drive shaft 20, and a propeller 26 is engaged to an opposing end of shaft 24. Propeller 26 includes an outer hub 28 through which exhaust gas is discharged. Gear case 22 includes a bullet, or torpedo, 30 and a skeg 32 which depends vertically downwardly from torpedo 30.

Power head 14 includes an internal combustion engine having an exhaust system with an exhaust outlet. Power head 14 also includes an adapter 34. A port 36 is located in adapter and typically is used for emission testing of engine 10. A main exhaust gas duct extends through adapter 34 and exhaust housing 16 and into lower unit 18 so that exhaust flows from power head 14 through the gas duct and out hub 28.

Figure 2:
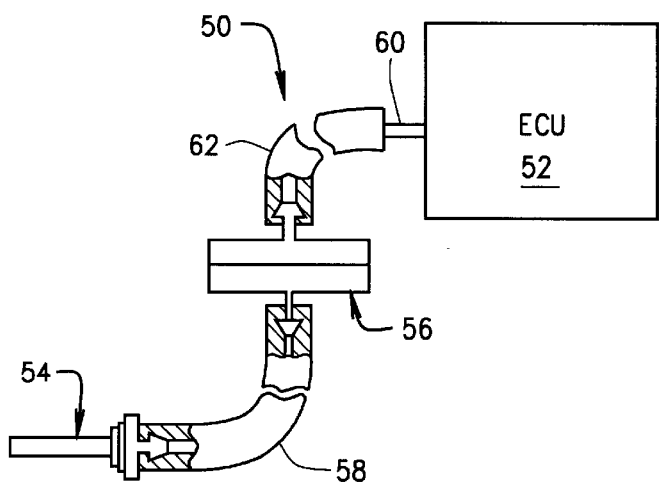
FIG. 2 is a schematic illustration of a probe and diaphragm assembly coupled to engine ECU.

FIG. 2 is a schematic illustration of a probe and diaphragm assembly 50 coupled to engine ECU 52. Assembly includes a probe 54 coupled to a diaphragm 56 by a first tube 58. Diaphragm 56 is coupled to ECU 52 at an ECU port 60 by a second tube 62. Generally, and with respect to engine 10 shown in FIG. 1, assembly 50 is located under cover 12 with probe 54 located within opening 36.

Alternatively, and rather than a diaphragm assembly, probe 54 can be directly connected to ECU port 60 by one tube (e.g., tube 58) of sufficient length. Diaphragm 56 is not necessarily required for use with each type of ECU depending upon whether the ECU can withstand direct communication with exhaust. Probe 54 therefore can be utilized with and without a diaphragm.

Figure 3:
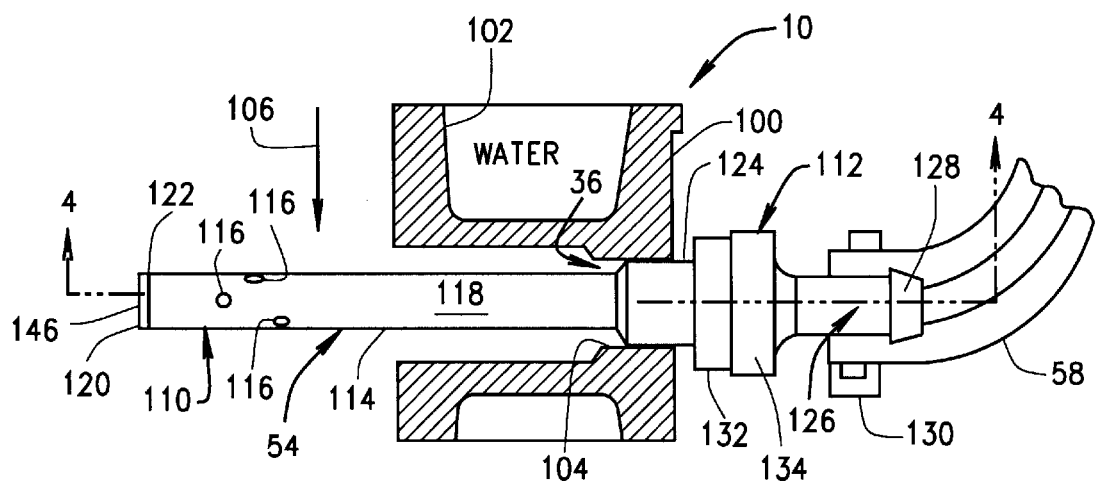
FIG. 3 is a partial cross-sectional view of a probe installed in an engine.

More specifically, FIG. 3 is a partial cross-sectional view of probe 54 installed in opening 36 of engine 10. A power head case 100 of engine 10 at opening 36 includes a water jacket 102 to cool case 100. Opening 36 is defined by a threaded wall 104. An exhaust duct, or path, 106 is formed by case 100, and path 106 extends from power head 14, through exhaust housing 16, and lower unit 18 (FIG. 1).

Probe 54 includes an elongate probe body 110, and an engine engagement assembly 112 secured to probe body 110 and configured to engage to the engine so that probe body 110 at least partially extends into the engine exhaust path. Elongate probe body 110 includes a hollow, cylindrical shaped member 114 having at least one opening 116 through a side wall 118. More specifically, and in the embodiment shown in FIG. 3, three openings 116 extend through cylindrical shaped member side wall 118. Openings 116 are radially spaced about 1200 apart from each adjacent opening 116. Openings 116 are not axially aligned so that exhaust cannot simply flow into one opening 116 and then out another opening 116 without any interference by probe 54. Of course, more than or fewer than three openings 116 can be utilized. Elongate probe body 110 further includes a cap 120 secured to and closing an open end 122 of cylindrical shaped member 114.

Engine engagement assembly 112 includes a threaded portion 124 sized to be threadedly engaged within opening 36, and a tube connection portion 126 sized to be inserted within tube 58. Tube connection portion 126 includes a head 128 to prevent unintended separation of probe 54 and tube 58. Tube 58 is secured to tube connection portion 126 by a locking ring 130. Assembly 112 also includes a sealing portion 132 which when probe 54 is fully tightened into opening 36, tightly fits against case 100. A hex portion 134 also is provided to facilitate securing probe 54 within opening 36 using a wrench or other mating tool.

Figure 4:
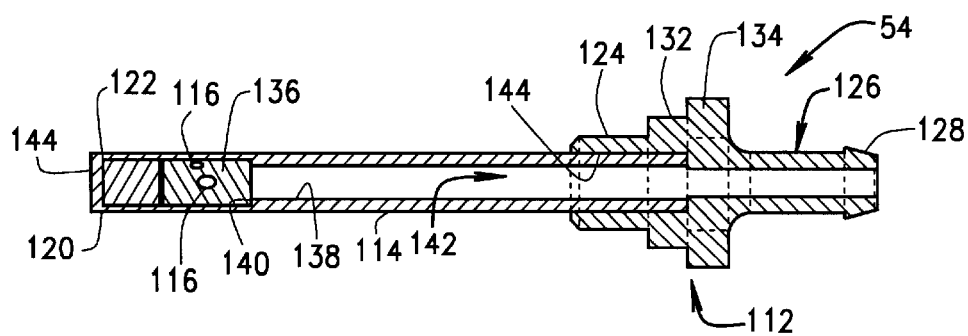
FIG. 4 is a cross-sectional view of the probe shown in FIG. 3 along Line 4—4.

FIG. 4 is a cross-sectional view of probe 54 along Line 4—4 in FIG. 3. As shown in FIG. 4, probe 54 includes a pellet 136 located within cylindrical shaped member 114. In an exemplary embodiment, pellet 136 is sintered metal. Cylindrical shaped member 114 includes an inner diameter surface 138, and a ledge 140 is formed by inner diameter surface 138. Pellet 136 is trapped between ledge 140 and cap 120 secured to and closing open end 122 of cylindrical shaped member 114. Pellet 136, in the exemplary embodiment, is at least coextensive with the location of openings 116 so that carbon and soot that may flow into probe 54 via openings 116 come into contact with pellet 136. A flow passage 142 extends longitudinally through probe 54 so that exhaust pulses are communicated through probe 54 and into tube 58.

FIG. 5 is an exploded view of probe 54. As clearly shown in FIG. 5, probe 54 includes elongate probe body 110, engine engagement assembly 112, and cap 120. Elongate body 110 is press fit into engagement with engine engagement assembly 112. Specifically, a bore 144 extends though threaded portion 124, and bore 144 is sized to form a tight fit with elongate body 110. Pellet 136 is inserted into body 110, and cap 120 is sized to be fit over pellet 136 and within body 110. Cap 120 forms a tight fit with body 110. Elongate body 110, engagement assembly 112, and cap 120 are fabricated, for example, from stainless steel. Pellet 136 is, for example, sintered metal.

To assembly probe 54 to power head 100, elongate body 110 is inserted through opening 36 and threaded portion 124 threadedly engages the threads of opening 36. A wrench or other tool can be used to tighted probe 54 so that seal portion 132 tightly fits against case 100. Tube 58 is then pushed over tube portion 126 and locking ring 130 securely maintains tube 58 in tight fit with portion 126. Probe tip 146 extends into exhaust duct 106 so that tip 146 is located within a hot portion of the exhaust flow during engine operation.

During engine operation, changes in exhaust pressure are transmitted through and along exhaust duct or path 106. Some exhaust flows into probe 54 through openings 116, and carbon and soot which may be contained in such exhaust is substantially blocked by sintered metal pellet 136 from flowing towards tube 58. That is, pellet 136 functions as a filter to prevent oil, soot, and carbon from entering blocking passage 142. Since tip 146 is located in the hot portion of the exhaust flow, such heat is transferred to pellet 136 and to the blocked soot and carbon. The temperature within probe 54 at pellet 136 can reach a sufficiently high temperature so that the soot and carbon burn in probe 54.

Figure 6:
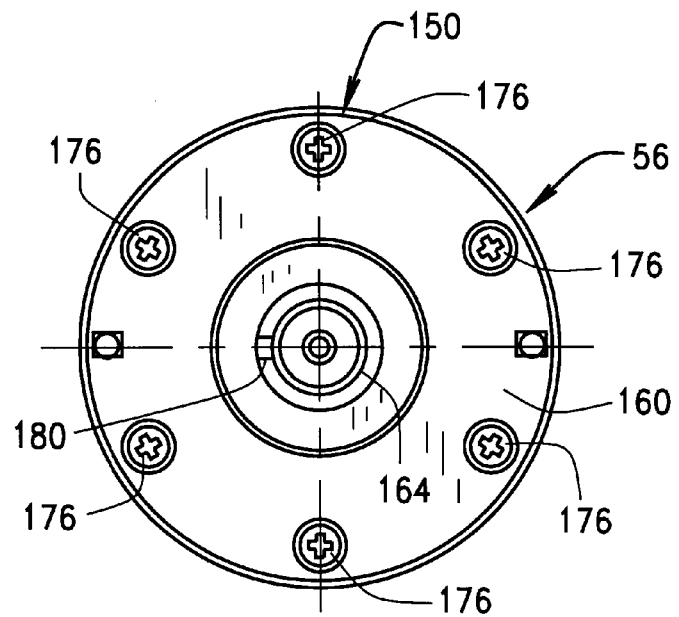
FIG. 6 is a right side view of a diaphragm.
Figure 7:
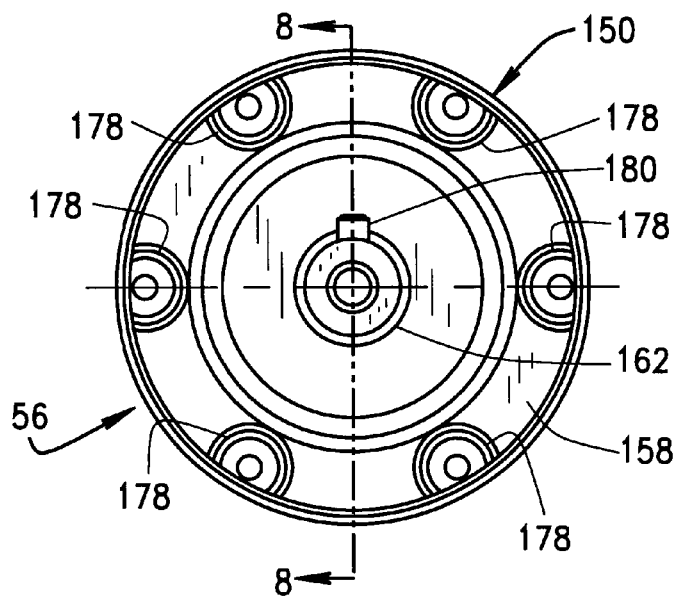
FIG. 7 is a left side view of a diaphragm.

Referring to FIGS. 6, 7, and 8, FIG. 6 is a right side view of diaphragm assembly 56, FIG. 7 is a left side view of assembly 56, and FIG. 8 is a cross sectional view along Line 8—8 shown in FIG. 7. Diaphragm assembly 56 includes a diaphragm housing 150 and a diaphragm 152 positioned in housing 150 and separating a first chamber 154 and a second chamber 156. First chamber 154 is configured to be in flow communication with the exhaust path and second chamber 156 is configured to be in flow communication with the engine control unit.

Diaphragm housing 150 includes a first housing member 158 and a second housing member 160. Housing members 158 and 160 are fabricated using, for example, plastic molding processes. First housing member 158 has an inlet 162, and second housing member 160 has an outlet 164. An inner surface 166 of first housing member 158 also is a side wall of first chamber 154, and inner surface 166 has a conical shape to facilitate drainage of water from first chamber 154. Also, first chamber 154 has a first volume and second chamber 156 has a second volume. The first volume is greater than the second volume.

Diaphragm 152 includes an o-ring 168 and a diaphragm member 170 integral with o-ring 168. O-ring 168 and diaphragm member 170 are fabricated, for example, from fluorosilicone. First and second housing members 158 and 160 each include an o-ring groove 172 and 174 so that when housing members 158 and 160 are assembled, diaphragm o-ring 168 is trapped between first and second housing members 158 and 160 in grooves 172 and 174. First and second housing members 158 and 160 are secured together by screws 176 which extend through openings in second housing member 160 and into threaded bosses 178 of first housing member 158.

Prior to operation of the engine, diaphragm assembly 56 is coupled to the engine so that first chamber 154 is in flow communication with the engine exhaust path and second chamber 156 is in flow communication with the engine control unit. In one embodiment, first tube 58 extends from inlet 162 to probe 54, and second tube 62 extends from outlet 164 to the engine ECU. Tubes 58 and 62 are secured to inlet 162 and outlet 164 by locking rings 180.

Tube 62 may include a flow restrictor 182 to dampen pressure spikes transmitted through tube 62 to the engine ECU, resulting in the final pressure reading at the ECU representing an averaged measure of the exhaust gas pressure. Restrictor 182 may, for example, be fabricated from brass and include a reduced size flow section 184 having a through hole with a diameter of about 20/1000 of an inch.

The air in second chamber 156 and tube 62 is trapped. That is, second chamber 156 and tube 62 are sealed so that air does not escape therefrom. Limiting the volume of trapped air is beneficial in that as such trapped air is heated and expands, such expanding air acts on diaphragm 152. It would be undesirable for diaphragm 152 to fully expand due to expansion of the trapped air since if diaphragm 152 fully expands into first chamber 154, will no longer communicate an accurate pressure change from first chamber 154 to second chamber 156. By limiting the volume of trapped air, the extent of the expansion of diaphragm 152 also is limited so that even on extremely hot days, diaphragm 152 still efficiently transmits exhaust pulses from first chamber 154 to second chamber 156.

During engine operation, changes in exhaust pressure are communicated to diaphragm 152 via first tube 58. The change in exhaust pressure causes diaphragm 152 to compress air in second chamber 154 and in second tube 62. As a result, the pressure change is transmitted through second chamber 154, second tube 62, and to the engine control unit. The engine control unit can use such exhaust gas pressure data to control engine operations, such as to control the fuel/air ratio in the engine cylinders.

The above described diaphragm facilitates communication of engine exhaust pulse information to an engine control unit and protects the control unit from direct exposure to the exhaust flow.

The above described probe could be sold in kit form. In an exemplary embodiment, the kit includes probe, and a tube for connecting probe to a diaphragm or directly to an engine ECU. Of course, locking rings also may be included in the kit for securing the tube to the tube connector portions of the various components.

While the invention has been described in terms of various specific embodiments, those skilled in the art will recognize that the invention can be practiced with modification within the spirit and scope of the claims.

What is claimed is:

1. A probe for being secured to a marine engine, an exhaust path extending through the engine, the engine including an electronic control unit, said probe comprising:
   an elongate probe body; and
   an engine engagement assembly secured to said probe body and configured to engage to the engine so that said probe body at least partially extends into the engine exhaust path, thereby communicating exhaust gas pressure to the electronic control unit.

2. A probe in accordance with claim 1 wherein said elongate probe body comprises a hollow, cylindrical shaped member.

3. A probe in accordance with claim 2 wherein said cylindrical shaped member comprises at least one opening through a side wall of said cylindrical shaped member.

4. A probe in accordance with claim 3 wherein three openings extend through said cylindrical shaped member side wall, said openings being radially spaced about 120° apart from each adjacent opening.

5. A probe in accordance with claim 2 wherein said elongate probe body further comprises a cap secured to and closing an open end of said cylindrical shaped member.

6. A probe in accordance with claim 2 further comprising a pellet located within said cylindrical shaped member.

7. A probe in accordance with claim 6 wherein said pellet comprises sintered metal.

8. A probe in accordance with claim 6 wherein said cylindrical shaped member comprises an inner diameter surface, a ledge formed in said inner diameter surface, and said pellet is trapped between said ledge and a cap secured to and closing an open end of said cylindrical shaped member.

9. A probe in accordance with claim 1 wherein said engine engagement assembly comprises a threaded portion sized to be threadedly engaged within an opening in flow communication with the engine exhaust path.

10. A probe in accordance with claim 1 wherein said engine engagement assembly comprises a tube connection portion sized to be inserted within a tube.

11. A probe for being secured to a marine engine, an exhaust path extending through the engine, said probe comprising:
   an elongate probe body comprising a hollow, cylindrical shaped member, said cylindrical shaped member comprises at least one opening through a side wall of said cylindrical shaped member, said elongate body further comprising a cap secured to and closing an open end of said cylindrical shaped member;
   a pellet located within said probe body cylindrical shaped member; and
   an engine engagement assembly secured to said probe body and configured to engage to the engine so that said probe body at least partially extends into the engine exhaust path for detecting exhaust gas pressure.

12. A probe in accordance with claim 11 wherein three openings extend through said cylindrical shaped member side wall, said openings being radially spaced about 120°0 apart from each adjacent opening.

13. A probe in accordance with claim 11 wherein said pellet comprises sintered metal.

14. A probe in accordance with claim 11 wherein said cylindrical shaped member comprises an inner diameter surface, a ledge formed in said inner diameter surface, and said pellet is trapped between said ledge and said cap.

15. A probe in accordance with claim 11 wherein said engine engagement assembly comprises a threaded portion sized to be threadedly engaged within an opening in flow communication with the engine exhaust path.

16. A probe in accordance with claim 11 wherein said engine engagement assembly comprises a tube connection portion sized to be inserted within a tube.

17. A method for securing an engine exhaust probe to an engine, said method comprising the steps of:

at least partially inserting the probe through an opening in the engine;

securing the probe in place so that at least a portion of the probe extends into an exhaust path of the engine; and engaging a tube to the probe so that during engine operation, exhaust pulses sensed by the probe are transmitted through the probe to the tube to indicate exhaust gas pressure.

18. A method in accordance with claim 17 where securing the probe in place comprises the step of threadedly engaging the probe within an opening in the engine.

19. A method in accordance with claim 17 wherein the probe extends into the exhaust path so that carbon and soot from an engine exhaust stream that flow into the probe are burned during engine operation.

20. Apparatus for sensing engine exhaust pulses during engine operation, said apparatus comprising:

probe means for sensing exhaust gas pressure of exhaust pulses during engine operation; and engagement means secured to said probe means for securing said probe so that said probe at least partially extends within an exhaust path of the engine during engine operation.

21. Apparatus in accordance with claim 20 wherein said probe means comprises an elongate probe body comprising a hollow, cylindrical shaped member.

22. Apparatus in accordance with claim 21 wherein said cylindrical shaped member comprises at least one opening through a side wall of said cylindrical shaped member.

23. Apparatus in accordance with claim 22 wherein three openings extend through said cylindrical shaped member side wall, said openings being radially spaced about 120° apart from each adjacent opening.

24. Apparatus in accordance with claim 22 wherein said elongate probe body further comprises a cap secured to and closing an open end of said cylindrical shaped member.

25. Apparatus in accordance with claim 20 further comprising a pellet located within said probe means.

26. Apparatus in accordance with claim 25 wherein said pellet comprises sintered metal.

27. Apparatus in accordance with claim 20 wherein said engagement means comprises an engine engagement assembly secured to said probe means and configured to engage to the engine so that said probe means at least partially extends into the engine exhaust path.

28. Apparatus in accordance with claim 27 wherein said engine engagement assembly comprises a threaded portion sized to be threadedly engaged within an opening in flow communication with the engine exhaust path.

29. Apparatus in accordance with claim 27 wherein said engine engagement assembly comprises a tube connection portion sized to be inserted within a tube.

30. An engine comprising:

a powerhead;

an exhaust housing extending from said power head;

a lower unit extending from said exhaust housing;

an exhaust path extending from said power head and through said exhaust housing and said lower unit; and a probe comprising an elongate probe body, and an engine engagement assembly secured to said probe body and engaged relative to said exhaust path so that said probe body at least partially extends into said engine exhaust path for determining exhaust gas pressure in said exhaust path.

31. An engine in accordance with claim 30 wherein said elongate probe body comprises a hollow, cylindrical shaped member comprising a side wall and at least one opening through said side wall.

32. An engine in accordance with claim 31 wherein three openings extend through said cylindrical shaped member side wall, said openings being radially spaced about 120° apart from each adjacent opening.

33. An engine in accordance with claim 31 wherein said elongate probe body further comprises a cap secured to and closing an open end of said cylindrical shaped member.

34. An engine in accordance with claim 31 further comprising a pellet located within said cylindrical shaped member.

35. An engine in accordance with claim 34 wherein said pellet comprises sintered metal.

36. An engine in accordance with claim 35 wherein said cylindrical shaped member comprises an inner diameter surface, a ledge formed in said inner diameter surface, and said pellet is trapped between said ledge and a cap secured to and closing an open end of said cylindrical shaped member.

37. An engine in accordance with claim 30 wherein said engine engagement assembly comprises a threaded portion sized to be threadedly engaged within an opening in flow communication with the engine exhaust path.

38. An engine in accordance with claim 30 wherein said engine engagement assembly comprises a tube connection portion sized inserted within a tube.

39. A kit comprising a probe for being secured to a marine engine, an exhaust path extending through the engine, said probe comprising an elongate probe body, and an engine engagement assembly secured to said probe body and configured to engage to the engine so that said probe body at least partially extends into the engine exhaust path to communicate exhaust gas pressure.

40. A kit in accordance with claim 39 wherein said elongate probe body comprises a hollow, cylindrical shaped member comprising at least one opening through a side wall of said cylindrical shaped member.

41. A kit in accordance with claim 40 wherein three openings extend through said cylindrical shaped member side wall, said openings being radially spaced about 120° apart from each adjacent opening.

42. A kit in accordance with claim 40 wherein said elongate probe body further comprises a cap secured to and closing an open end of said cylindrical shaped member.

43. A kit in accordance with claim 39 further comprising a pellet located within said probe body.

44. A kit in accordance with claim 43 wherein said pellet comprises sintered metal.

45. A kit in accordance with claim 39 wherein said engine engagement assembly comprises a threaded portion sized to be threadedly engaged within an opening in flow communication with the engine exhaust path.

46. A kit in accordance with claim 39 wherein said kit further comprises a tube, and said engine engagement assembly comprises a tube connection portion sized to be inserted within said tube.

* * * * *